R. H. & G. F. Cole,

Hay Press.

No. 100,861.  Patented Mar. 15, 1870.

Inventors:
R. H. Cole
G. F. Cole

Witnesses

R.H. & G.F. Cole,
Hay Press.

No. 100,861.　　　　Patented Mar. 15, 1870.

2 Sheets, Sheet 2.

Witnesses　　　　　Inventors:
　　　　　　　　　　R. H. Cole.
　　　　　　　　　　G. F. Cole.

United States Patent Office.

ROWLAND H. COLE AND GEORGE F. COLE, OF GREENPORT, NEW YORK.

Letters Patent No. 100,861, dated March 15, 1870.

IMPROVEMENT IN HAY AND COTTON-PRESSES.

The Schedule referred to in these Letters Patent and making part of the same.

We, ROWLAND H. COLE and GEORGE F. COLE, of the town of Greenport, in the county of Columbia and State of New York, have invented a new and improved Mode of Constructing a Press for Compressing Hay, Straw, Cotton, and other loose materials into bales, of which the following is a description and specification.

Nature and Objects of the Invention.

The first part of our invention relates to the mode of filling the press, the object being to dispense with the labor of the man usually employed in the box for this purpose, by substituting an alternating top-press or stamper, which packs down and partially compresses the material as it is thrown into the box.

The second part of the invention relates to the combination with the stamping or top-pressing operation of an automatic opening and closing of the press-door.

A third part of our invention relates to the mode, in combination with the above, but in alternation as to time, and while the stamper is firmly locked and made the head-block of the press, of elevating the bottom until the bale is formed and sufficiently compressed, and, again, of conveniently and expeditiously throwing the operating mechanism into and out of gear, according as one or the other of the above uses or effects is desired to be accomplished.

Description of the Accompanying Drawings.

Like letters on each of the figures indicate like parts.

General Description.

In the construction of our press we employ the ordinary rectangular upright frame and box, (see figs. 1 and 2,) of dimensions proportionate to the size of the bale we desire to make.

The motive power is communicated by means of the bevel gear-wheels $a$ $a'$, actuating the horizontal shaft $b$, and the two small cog-wheels $c$ $c'$, one on each side of the bottom of the press.

Figure 1:
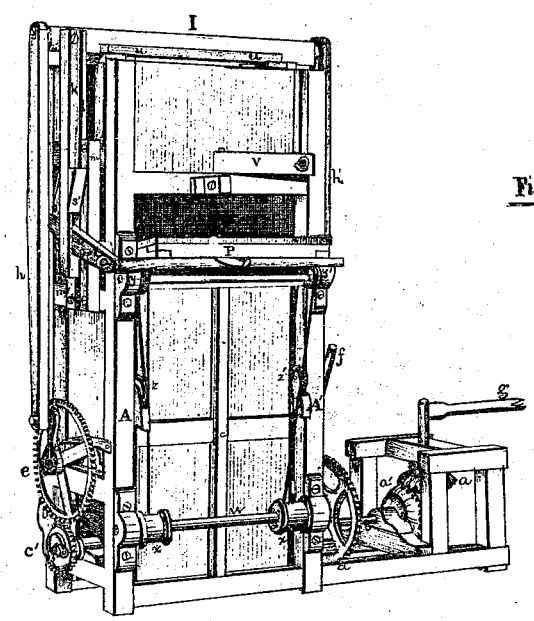
Figure 1 is a perspective elevation showing the front and left-hand side of this press when the door is open, and also the mechanism for opening and closing the door, the box being empty.
Figure 2:
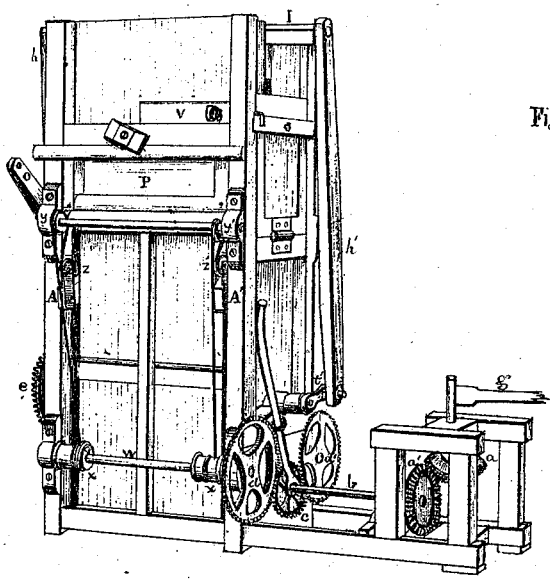
Figure 2 is a perspective elevation of the same, showing the front and right-hand side, the door being closed and the bottom of the press elevated as when the bale is finished.

These wheels work, the one $c$, fig. 2, into the two press-wheels $d$ $d'$, and the other $c'$, fig. 1, into the single cog-wheel $e$, at the will of the operator, and according as one or the other part of the press is required to be employed.

When it is desired to fill the press-box, the wheel $c$ is disconnected or thrown out of gear by means of lever $f$, or other equivalent device.

The wheel $c'$, which is loose on the shaft $b$, is provided with pawl and ratchet, so as to be operated by the shaft when revolved in one direction, but allowing the shaft to turn freely in its hub when revolved in the opposite direction.

The team or power being reversed so as to revolve the sweep or tongue $g$ from left to right, operates, by engaging the wheel $e$, the pitmen $h$ $h'$, one on each side of the press. These are connected to the ends of the cross-beam I, to which are also attached two upright studs $u$ $u$ within the box, to support and operate the stamper or head-block.

There is also attached to cross-beam I on the left-hand side of the press-box the vertical bar $k$, with dovetail tongue $l$ on the inside thereof, fitted to slide up and down between vertical bars $m$ $m$ forming a corresponding groove for tongue $l$.

Near the lower end of bar $k$ is a mortise or slot, $n$, through which the lever $o$ passes, being connected at its outer or front end with the frame of door P, its inner or opposite end resting loosely in the slot $n$, with fulcrum at $r$.

The lower or under edge of the inner end of this lever is beveled or curved so as to correspond with the swing of the door, and slide freely in the slot as the bar $k$ rises and falls.

The wedge-shaped pieces $s$ $s'$, attached to slide-bar $k$ at the upper end of slot $n$, operate as bearings for lever $o$, the one, $s$, aids in closing the door, and the other, $s'$, supports it at any point of opening.

The press-box is filled through the door P which is opened and closed by the lever $o$, operated as above described, and the material thrown into it stamped and pressed down by the action of the head-block within, as much as desired. This being done, the head-block is let down even with the top of the door P where it is firmly locked by means of wedge or check-blocks attached to the inside of swing-bars $v$ $v$, and which pass through the box into or directly above the head-block. These are situated diagonally opposite to each other on opposite sides or corners of the box.

Care must be had when the stamper is in operation that these bars are swung out, so that the check-blocks do not interfere with the upward and downward motions of the stamper.

The head-block being locked as before described, we throw the cog-wheel $c$, fig. 2, into gear with the two press-wheels $d$ $d'$, which operate the shafts with their barrels $x$ $x'$ at the bottom of the press.

Ropes or chains are attached to these barrels, and pass from them up and over the grooved pulleys $y$ $y'$, thence down and around the pulleys $z$ $z'$, and thence up to the cross-beam of the press at the lower edge of the door P, where they are attached.

The sheaves or pulley-blocks $y$ $y'$ are firmly strapped to the ends of the lifting-bars A A' which carry the bottom or floor of the press, extending out through slots in the sides of the box.

The several parts last above described, relating to the upward press, have their correspondents on the opposite side, not shown in the drawings.

By applying the motive power and revolving the tongue or sweep $g$ from right to left, the wheels $c$ and $d\ d'$ being in gear, the barrels $x\ x'$ are revolved, wind-up the cords or chains attached, and thus the lifting-bars A A' are elevated until the bottom of the press reaches the lower edge of the door P, when the bale is presumed to be sufficiently compressed. It is then hooped or wired as usual, and rolled out a completed bale.

We claim as our invention—

1. The combination of the slotted slide-bar $k$, with the vertical ways or guide-pieces $m\ m$, lever $o$, pitmen $h\ h'$ cranks $t\ t'$, and wheel $e$, for operating the door P, all constructed to operate substantially as herein set forth.

2. The combination of the cross-bar I, pitmen $h\ h'$, wheels $d\ d'$ and $e$, cranks $t\ t'$, cog-wheels $c\ c'$, and bevel gear-wheels $a\ a'$ for operating the head-block or stamper, substantially as herein set forth.

3. The combination and arrangement of the lifting-bars A A, pulleys $y\ y'$ and $z\ z'$, with ropes or chains as shown, shafts $w\ w'$, drums $x\ x'$, wheels $d\ d'$ and $c$, and bevel gear-wheels $a\ a'$, all constructed to operate substantially in the manner herein set forth.

R. H. COLE.
G. F. COLE.

Witnesses:
SHERMAN VAN NESS,
JAS. M. PUNDERSON.